US009997993B1

(12) United States Patent
Wu et al.

(10) Patent No.: US 9,997,993 B1
(45) Date of Patent: Jun. 12, 2018

(54) SINGLE-PHASE BRIDGELESS INSULATED POWER FACTOR ADJUSTMENT CIRCUIT

(71) Applicant: NATIONAL CHUNG SHAN INSTITUTE OF SCIENCE AND TECHNOLOGY, Taoyuan (TW)

(72) Inventors: Chi-Sheng Wu, Taoyuan (TW); Gwo-Huei You, Taoyuan (TW); Hsuang-Chang Chiang, Taoyuan (TW); Tsang-Li Tai, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days. days.

(21) Appl. No.: 15/375,209

(22) Filed: Dec. 12, 2016

(51) Int. Cl.
*H02M 1/42* (2007.01)
*H02M 1/00* (2006.01)

(52) U.S. Cl.
CPC .......... *H02M 1/42* (2013.01); *H02M 1/4208* (2013.01); *H02M 1/4258* (2013.01); *H02M 2001/0067* (2013.01); *H02M 2001/0074* (2013.01); *H02M 2001/0077* (2013.01)

(58) Field of Classification Search
CPC .... H02M 1/42; H02M 1/4208; H02M 1/4258; H02M 2001/0067; H02M 2001/0074; H02M 2001/0077
See application file for complete search history.

(56) References Cited

U.S. PATENT DOCUMENTS

| 2009/0290384 | A1* | 11/2009 | Jungreis | H02M 1/4241 363/17 |
| 2015/0162821 | A1* | 6/2015 | Wu | H02M 1/4225 363/21.17 |
| 2015/0280548 | A1* | 10/2015 | Shoyama | H02M 1/4225 363/126 |
| 2017/0025962 | A1* | 1/2017 | Davidson | H02M 1/44 |

* cited by examiner

*Primary Examiner* — Fred E Finch, III
*Assistant Examiner* — Rafael O De Leon Domenech
(74) *Attorney, Agent, or Firm* — Schmeiser, Olsen & Watts, LLP

(57) ABSTRACT

A single-phase bridgeless insulated power factor adjustment circuit includes an EMI filter module, low-frequency switching diode module, two switches and two insulated voltage transformation modules. The EMI filter module is coupled to an AC power. The low-frequency switching diode module is coupled to the EMI filter module. The two switches are coupled to the low-frequency switching diode module. The two insulated voltage transformation modules are coupled to one of the two switches. With the low-frequency switching diode module being in first ON state, one of the two switches turns on, and one of the two insulated voltage transformation modules turns on. With the low-frequency switching diode module being in second ON state, the other switch turns on, and the other insulated voltage transformation module turns on. Hence, the circuit is unlikely to fail, but features simple circuitry, incurs low costs, be compact, and achieves high conversion efficiency.

7 Claims, 12 Drawing Sheets

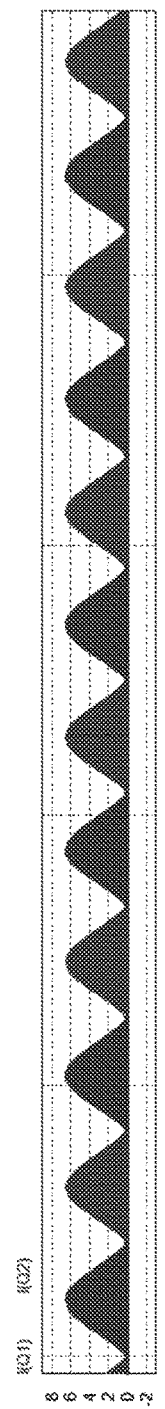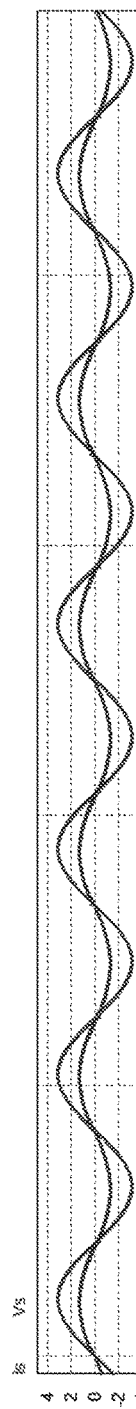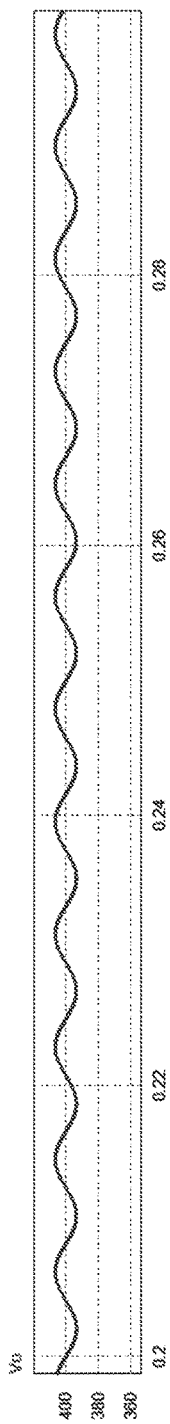
FIG. 11A
FIG. 11B
FIG. 11C
FIG. 11D

SINGLE-PHASE BRIDGELESS INSULATED POWER FACTOR ADJUSTMENT CIRCUIT

FIELD OF THE INVENTION

The present invention relates to power factor adjustment circuits and, more particularly, to a single-phase insulated power factor adjustment circuit.

BACKGROUND OF THE INVENTION

Referring to FIG. 1, a conventional single-phase high-power-factor switchable power supply 1000 which comes with two levels of circuit framework. The front level is a non-insulated PFC rectifier 1100, and the rear level is an insulated DC-DC converter 1200. FIG. 2 and FIG. 3 depict conventional switchable power supplies 2000, 3000, respectively. FIG. 2 shows that a PFC boost AC-DC rectifier 2100 is coupled to a full-bridge phase shift DC-DC converter 2200. FIG. 3 shows that a boost AC-DC rectifier 3100 is coupled to a LLC resonant DC-DC converter 3200. The switchable power supplies 2000, 3000 of FIG. 2 and FIG. 3 are applicable to AC power SAC and loads.

However, conventional PFC circuits have drawbacks as follows: (1) switchable power supplies which come with a bridge rectifier inevitably incur high conduction loss; (2) switchable power supplies which dispense with a bridge rectifier have a circuit framework lacking any transformer; (3) due to high capacitance on the DC output side of a boost PFC converter, AC voltage input instantaneously charges the DC capacitor and thus generates a high input current, causing failures of the rectifier or the output diode, not to mention that the DC capacitor is likely to be overcharged and thus causes damage to main power device; and (4) in a control system for the switchable power supplies, power factor-related control is exercised on the primary side, whereas the DC-DC converter is place under control on the secondary side; hence, it is necessary to achieve separation of the primary and secondary sides in order to enable the control system to operate smoothly, thereby rendering the circuit intricate.

Accordingly, it is imperative to provide an insulated PFC circuit framework which overcomes the aforesaid drawbacks of the conventional PFC circuit.

SUMMARY OF THE INVENTION

In view of the aforesaid drawbacks of the prior art, it is an objective of the present invention to provide a single-phase bridgeless insulated power factor adjustment circuit which is unlikely to fail, but features a simple circuitry, incurs low conduction loss and low costs, be compact, and achieves high conversion efficiency.

In order to achieve the above and other objectives, the present invention provides a single-phase bridgeless insulated power factor adjustment circuit which comprises an EMI filter module, a low-frequency switching diode module, a first switch, a second switch, a first insulated voltage transformation module and a second insulated voltage transformation module.

The EMI filter module is coupled to an external AC power. The low-frequency switching diode module is coupled to the EMI filter module. The first switch and the second switch are coupled to the low-frequency switching diode module. The first insulated voltage transformation module is coupled to the first switch. The second insulated voltage transformation module is coupled to the second switch.

With the low-frequency switching diode module being in first ON state, the first switch turns on, and the first insulated voltage transformation module turns on.

With the low-frequency switching diode module being in second ON state, the second switch turns on, and the second insulated voltage transformation module turns on.

Regarding the single-phase bridgeless insulated power factor adjustment circuit, the low-frequency switching diode module comprises a first one-way diode unit and a second one-way diode unit, the low-frequency switching diode module being in first ON state being defined as allowing the second one-way diode unit to turn on and allowing the first one-way diode unit to turn off, the low-frequency switching diode module being in second ON state being defined as allowing the first one-way diode unit to turn on and allowing the second one-way diode unit to turn off.

Regarding the single-phase bridgeless insulated power factor adjustment circuit, the first one-way diode unit and the second one-way diode unit take turn turning on such that the low-frequency switching diode module can be switched between the first ON state and the second ON state.

Regarding the single-phase bridgeless insulated power factor adjustment circuit, the EMI filter module comprises a first inductor, a second inductor, and a first capacitor. The first inductor has one end coupled to one end of the AC power. The second inductor has one end coupled to the other end of the AC power. The two ends of the first capacitor are coupled to the other end of the first inductor and the other end of the second inductor, respectively.

Regarding the single-phase bridgeless insulated power factor adjustment circuit, the low-frequency switching diode module comprises a first one-way diode unit and a second one-way diode unit. The negative terminal of the first one-way diode unit is coupled to one end of the first capacitor and the other end of the first inductor. The negative terminal of the second one-way diode unit is coupled to the other end of the first capacitor and the other end of the second inductor.

Regarding the single-phase bridgeless insulated power factor adjustment circuit, the positive terminal of the first one-way diode unit and the positive terminal of the second one-way diode unit are coupled to a first node, whereas one end of the first switch and one end of the second switch are coupled to a second node. The first node is coupled to the second node.

The single-phase bridgeless insulated power factor adjustment circuit further comprises a first surge absorbing module and a second surge absorbing module. The first surge absorbing module is coupled to the first switch and the first insulated voltage transformation module. The second surge absorbing module is coupled to the second switch and the second insulated voltage transformation module.

The single-phase bridgeless insulated power factor adjustment circuit further comprises a first control module and a second control module. The first control module is coupled to a gate-end of the first switch to control the first switch to turn on and turn off. The second control module is coupled to a gate-end of the second switch to control the second switch to turn on and turn off.

Regarding the single-phase bridgeless insulated power factor adjustment circuit, the first control module comprises a first voltage control unit, a first zero current detection unit and a first comparison unit. The first control module is coupled to the output end of the first insulated voltage transformation module to receive a first output voltage feedback signal. The first voltage control unit adjusts the first output voltage feedback signal to send a first switch current control signal. The first zero current detection unit is coupled to the first insulated voltage transformation module to send a first zero current detection signal. The first comparison unit compares the first switch current control signal with the voltage at one end of the first switch and sends a first control signal according to the comparison result and the first zero current detection signal. The first control signal is for use to control the first switch to turn on and turn off.

Regarding the single-phase bridgeless insulated power factor adjustment circuit, the second control module comprises a second voltage control unit, a second zero current detection unit and a second comparison unit. The second control module is coupled to the output end of the second insulated voltage transformation module to receive a second output voltage feedback signal. The second voltage control unit adjusts the second output voltage feedback signal to send a second switch current control signal. The second zero current detection unit is coupled to the second insulated voltage transformation module to send a second zero current detection signal. The second comparison unit compares the second switch current control signal with the voltage at one end of the second switch and sends a second control signal according to comparison result and the second zero current detection signal output. The second control signal is for use to control the second switch to turn on and turn off.

In conclusion, give the aforesaid circuit configuration, the single-phase bridgeless insulated power factor adjustment circuit of the present invention is unlikely to fail, features a simple circuit, saves costs, be compact, and displays high conversion efficiency.

BRIEF DESCRIPTION OF THE DRAWINGS

Objectives, features, and advantages of the present invention are hereunder illustrated with specific embodiments in conjunction with the accompanying drawings, in which:

FIG. 11A through FIG. 11D show waveforms illustrative of results of the simulation achieved by the circuit diagram of FIG. 9.

DETAILED DESCRIPTION OF THE PREFERRED EMBODIMENTS

Figure 1:
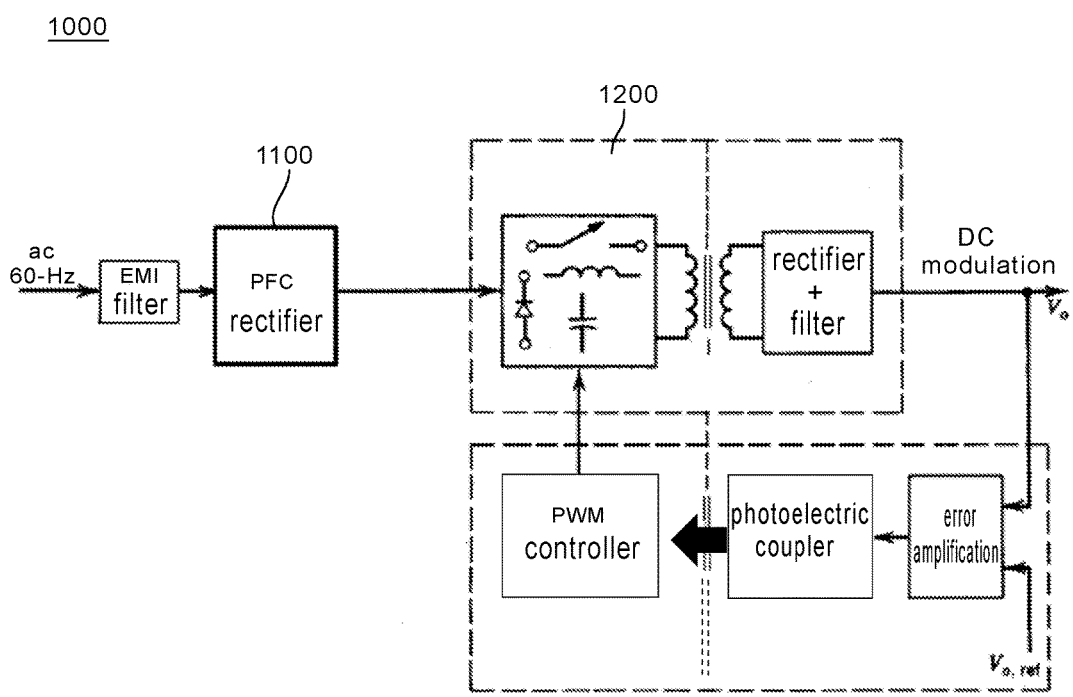
FIG. 1 (PRIOR ART) is a circuit diagram of an embodiment of a conventional switchable power supply.
Figure 2:
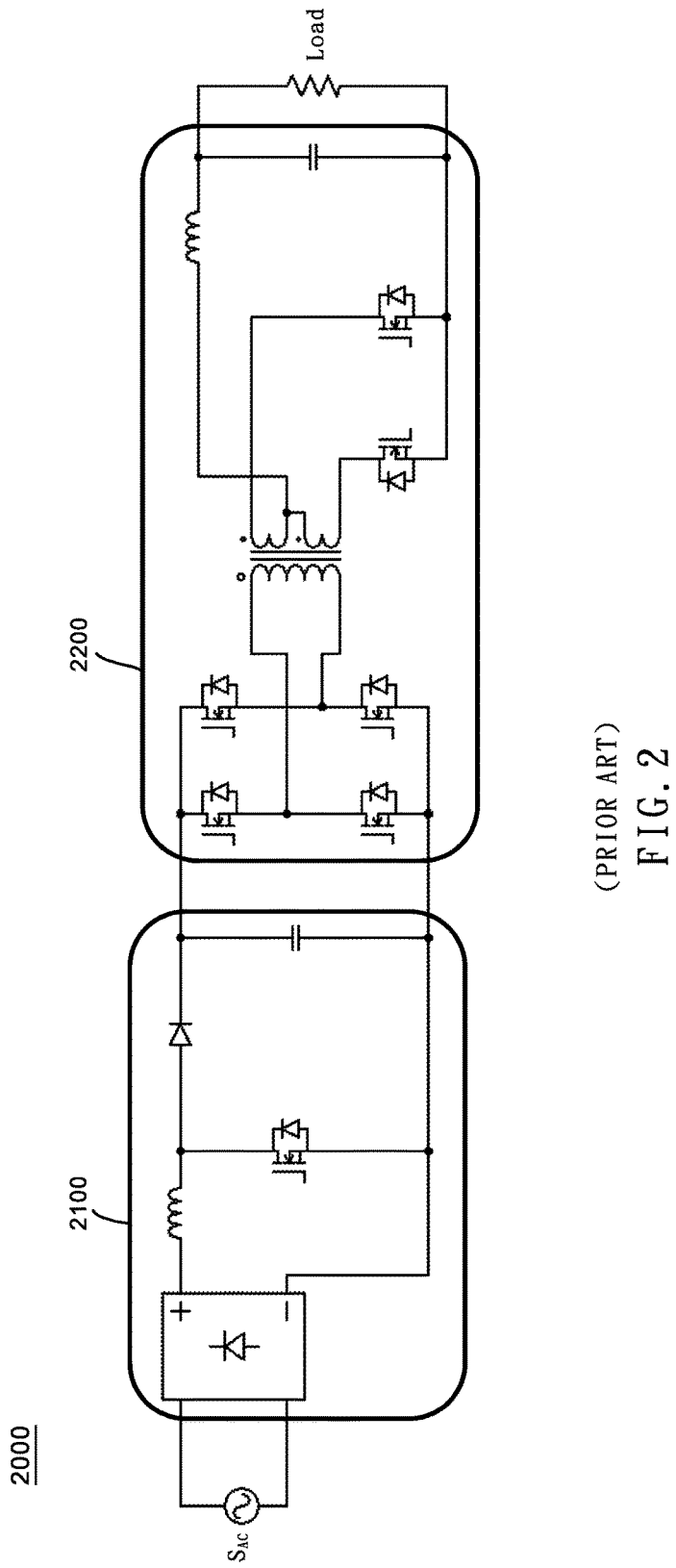
FIG. 2 (PRIOR ART) is a circuit diagram of another embodiment of the conventional switchable power supply.
Figure 3:
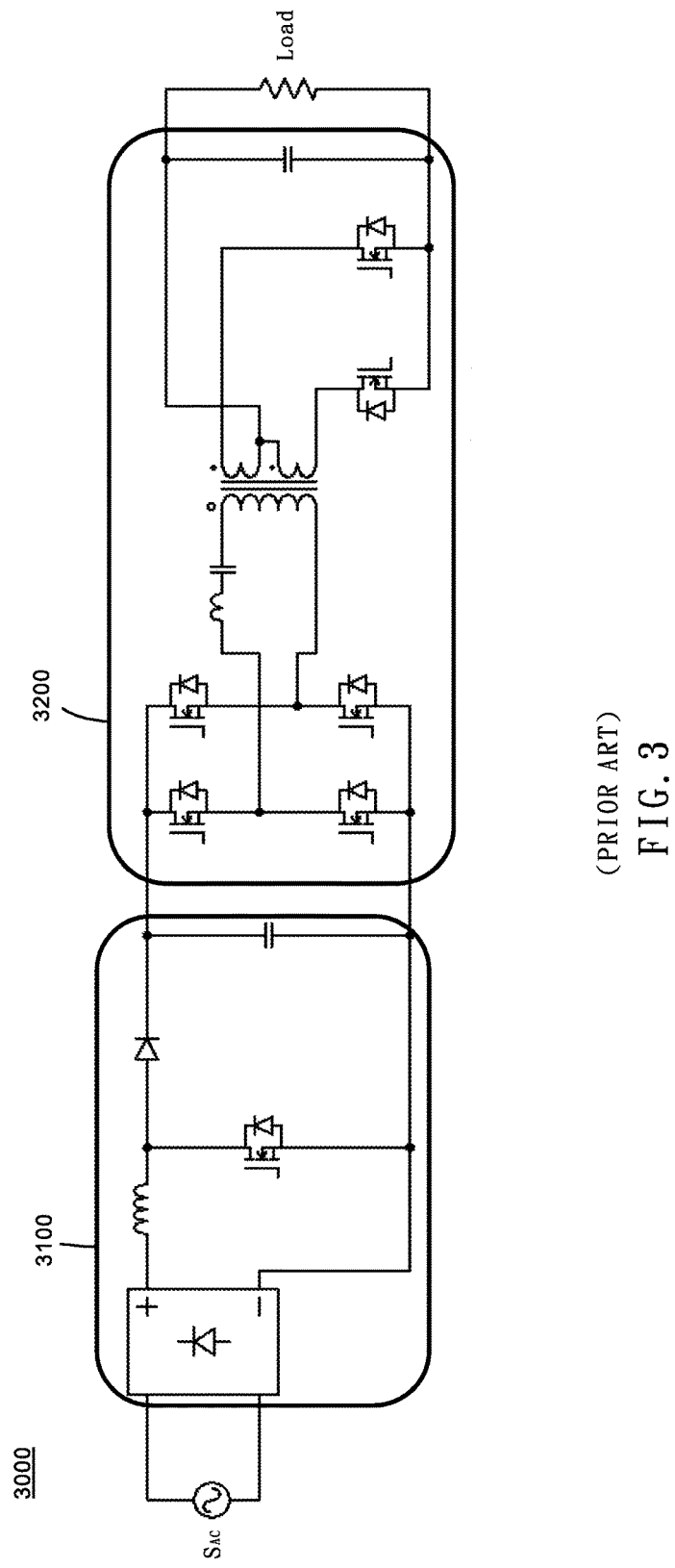
FIG. 3 (PRIOR ART) is a circuit diagram of yet another embodiment of the conventional switchable power supply.
Figure 4:
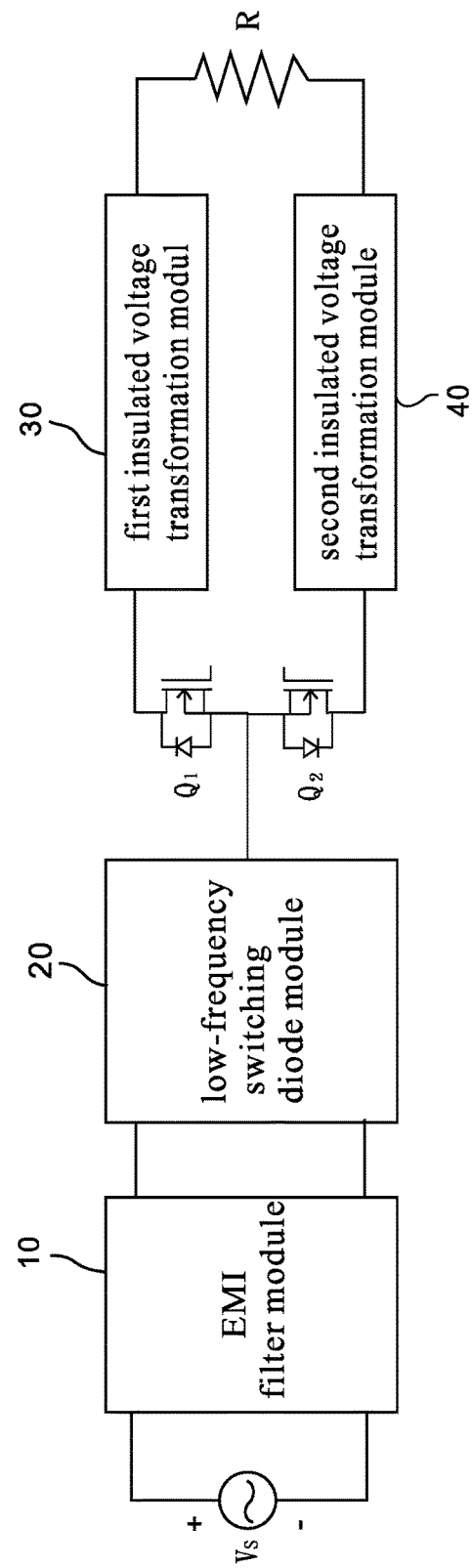
FIG. 4 is a schematic view of a single-phase insulated power factor adjustment circuit according to an embodiment of the present invention.
Figure 5A:
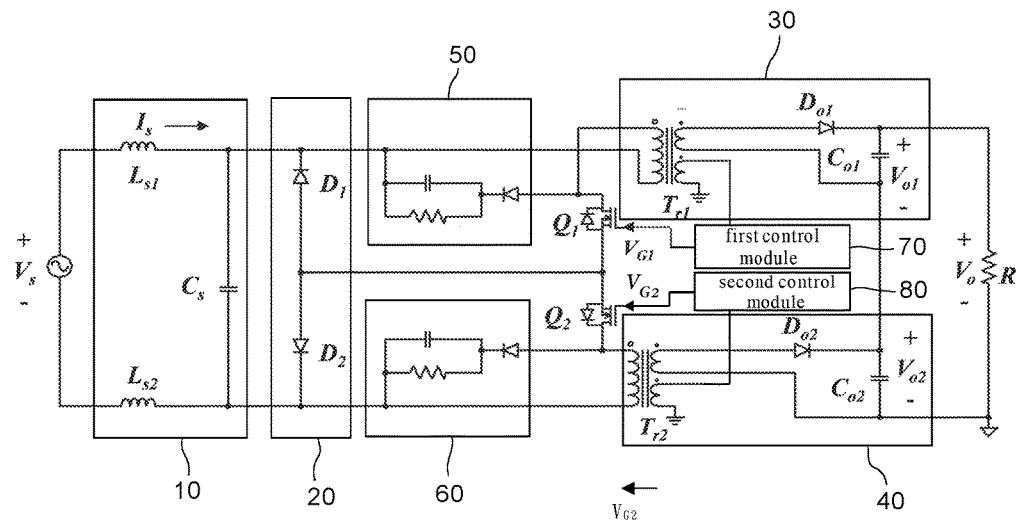
FIG. 5A is a circuit diagram of the single-phase insulated power factor adjustment circuit according to another embodiment of the present invention.

Referring to FIG. 4 and FIG. 5A, FIG. 4 is a schematic view of a single-phase insulated power factor adjustment circuit according to an embodiment of the present invention, and FIG. 5A is a circuit diagram of the single-phase insulated power factor adjustment circuit according to another embodiment of the present invention. Referring to FIG. 4 and FIG. 5A, the single-phase insulated power factor adjustment circuit comprises an EMI filter module 10, a low-frequency switching diode module 20, a first switch $Q_1$, a second switch $Q_2$, a first insulated voltage transformation module 30, and a second insulated voltage transformation module 40.

The EMI filter module 10 comprises a first inductor $L_{S1}$, a second inductor $L_{S2}$ and a first capacitor $C_S$. The first inductor $L_{S1}$ has one end coupled to one end of an external AC power $V_S$. The second inductor $L_{S2}$ has one end coupled to the other end of the AC power $V_S$. The two ends of the first capacitor $C_S$ are coupled to the other end of the first inductor $L_{S1}$ and the other end of the second inductor $L_{S2}$, respectively.

The AC power VS is utility electricity. The EMI filter module 10 is applicable to the AC power $V_S$ operating at different voltage levels (such as 110V, 220V). Referring to FIG. 5A, the first inductor $L_{S1}$ is coupled to the positive terminal of the AC power $V_S$, and the second inductor $L_{S2}$ is coupled to the negative terminal of the AC power $V_S$. In a variant embodiment, the first inductor $L_{S1}$ is coupled to the negative terminal of the AC power $V_S$, and the second inductor $L_{S2}$ is coupled to the positive terminal of the AC power $V_S$.

The low-frequency switching diode module 20 comprises a first one-way diode unit 21 and a second one-way diode unit 22. The first one-way diode unit 21 has just a one-way diode $D_1$, though it may have two or more one-way diodes connected in series or in parallel. The second one-way diode unit 22 has just a one-way diode $D_2$, though it may have two or more one-way diodes connected in series or in parallel.

The negative terminal of the first one-way diode unit 21 is coupled to one end of the first capacitor $C_S$ and the other end of the first inductor $L_{S1}$. The negative terminal of the second one-way diode unit 22 is coupled to the other end of the first capacitor $C_S$ and the other end of the second inductor $L_{S2}$.

The positive terminal of the first one-way diode unit 21 and the positive terminal of the second one-way diode unit 22 are coupled to a first node 1. One end of the first switch $Q_1$ and one end of the second switch $Q_2$ are coupled to a second node 2. The first node 1 is coupled to the second node 2.

The input end of the first insulated voltage transformation module 30 is coupled to the first switch $Q_1$. The input end of the second insulated voltage transformation module 40 is coupled to the second switch $Q_2$. The first insulated voltage transformation module 30 is a flyback converter which comes with an insulated coil $T_{r1}$, and its secondary side has diode $D_{o1}$ and capacitor $C_{o1}$. The capacitor $C_{o1}$ has a voltage difference $V_{o1}$. The second insulated voltage transformation module 40 is a flyback converter which comes with an insulated coil $T_{r2}$, and its secondary side has diode $D_{o2}$ and capacitor $C_{o2}$. The capacitor $C_{o2}$ has a voltage difference $V_{o2}$.

An external a load R is coupled to the output end of the first insulated voltage transformation module 30 and the output end of the second insulated voltage transformation module 40. The load R has a voltage difference $V_o$.

The single-phase bridgeless insulated power factor adjustment circuit further comprises a first surge absorbing module 50 and a second surge absorbing module 60. The first surge absorbing module 50 is coupled to the first switch $Q_1$ and the first insulated voltage transformation module 30 to reduce or absorb the surge which might otherwise affect the first switch $Q_1$. The second surge absorbing module 60 is coupled to the second switch $Q_2$ and the second insulated voltage transformation module 40 to reduce or absorb the surge which might otherwise affect the second switch $Q_2$.

Referring to FIG. 5A, the first surge absorbing module 50 comprises one capacitor, one resistor and one inverted diode, and this technical feature is illustrative rather than restrictive of an embodiment of the present invention. The second surge absorbing module 60 comprises one capacitor, one resistor and one inverted diode, and this technical feature is illustrative rather than restrictive of an embodiment of the present invention.

To reduce the current of a power device, reduce conduction loss, and preclude the recovery current loss of the diodes, the single-phase bridgeless insulated power factor adjustment circuit operates in critical conduction mode.

The single-phase bridgeless insulated power factor adjustment circuit comprises a first control module 70 and a second control module 80. The first control module 70 is coupled to a gate-end of the first switch $Q_1$ to control the first switch $Q_1$ to turn on and turn off. The second control module 80 is coupled to a gate-end of the second switch $Q_2$ to control the second switch $Q_2$ to turn on and turn off.

Figure 5B:
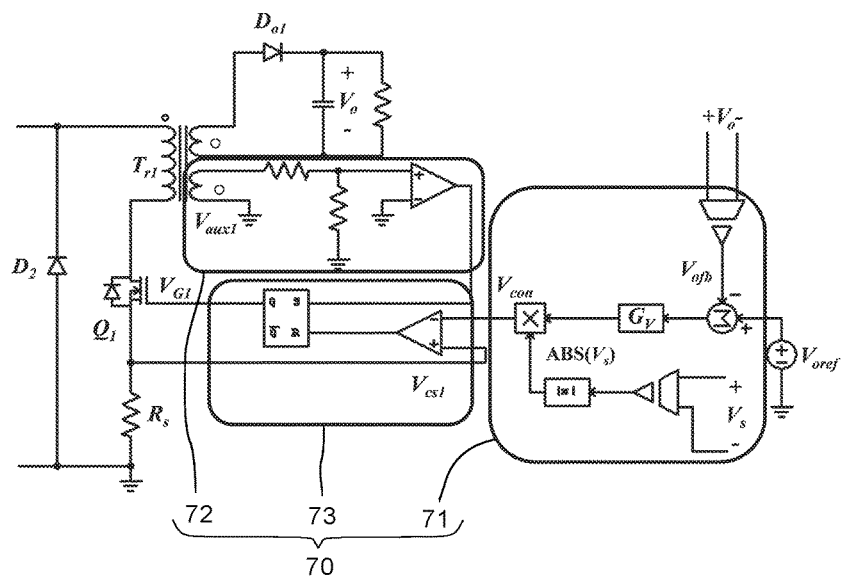
FIG. 5B is a circuit diagram of a control module of the single-phase insulated power factor adjustment circuit of the present invention.

Referring to FIG. 5B, the first control module 70 comprises a first voltage control unit 71, a first zero current detection unit 72 and a first comparison unit 73. The first control module 70 is coupled to the output end of the first insulated voltage transformation module 30 so as to receive a first output voltage feedback signal. The first voltage control unit 71 is adapted to adjust the first output voltage feedback signal so as to send a first switch current control signal. The first zero current detection unit 72 is coupled to the first insulated voltage transformation module 30 so as to send a first zero current detection signal. The first comparison unit 73 compares the first switch current control signal with the voltage at one end of the first switch $Q_1$ and sends a first control signal according to the comparison result and the first zero current detection signal. The first control signal is for use in controlling the first switch $Q_1$ to turn on and turn off.

The second control module 80 comprises a second voltage control unit 81, a second zero current detection unit 82 and a second comparison unit 83. The second control module 80 is coupled to the output end of the second insulated voltage transformation module 40 so as to receive a second output voltage feedback signal. The second voltage control unit 81 is adapted to adjust the second output voltage feedback signal so as to send a second switch current control signal. The second zero current detection unit 82 is coupled to the second insulated voltage transformation module 40 so as to send a second zero current detection signal. The second comparison unit 83 compares the second switch current control signal with the voltage at one end of the second switch $Q_2$ and sends a second control signal according to the comparison result and the second zero current detection signal. The second control signal is for use in controlling the second switch $Q_2$ to turn on and turn off.

Since the second control module 80 corresponds substantially to the first control module 70 in components, the components of the second control module 80 can be inferred with reference to FIG. 5B and thus are not reiterated herein for the sake of brevity.

Figure 6:
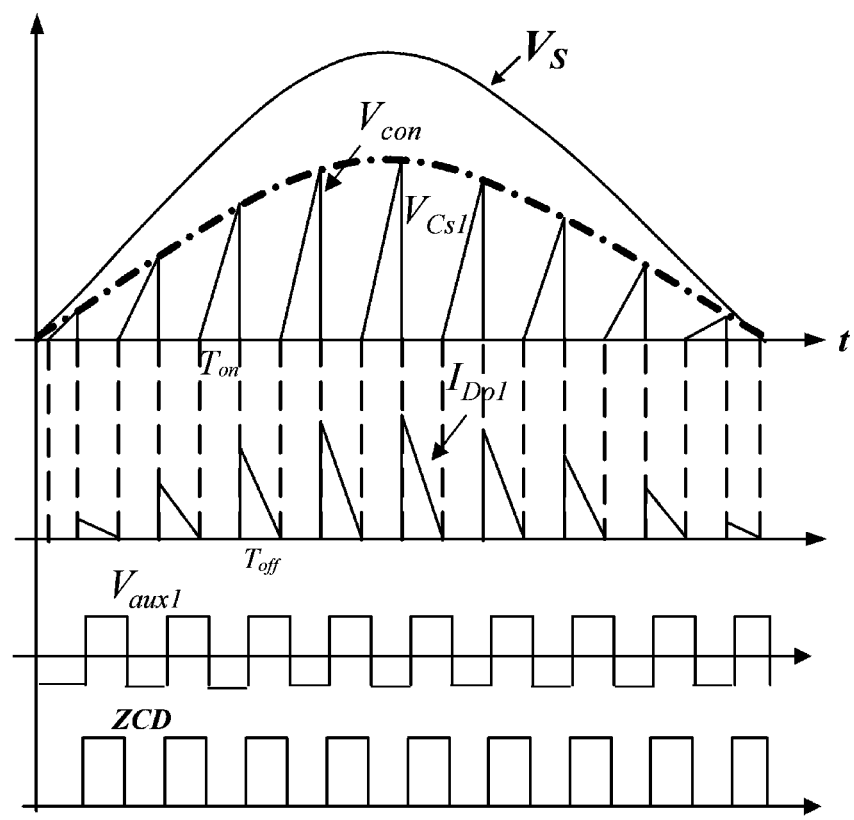
FIG. 6 shows operating waveforms of the single-phase bridgeless insulated power factor adjustment circuit according to another embodiment of the present invention.

In the first control module 70 and the second control module 80, the output voltage feedback signal $V_{ofb}$ is adjusted with a voltage controller and then multiplied by rectified AC power voltage signal $ABS(V_s)$ to obtain control signal $V_{con}$ of a switch current. Then, the control signal $V_{con}$ of the switch current is compared with a detected switch current $V_{cs1}$ before an RS flip-flop is reset, thereby stopping the switching function. Secondary side diode $D_{o1}$ releases stored energy of a transformer to a load R; meanwhile, a zero current detection (ZCD) unit uses an auxiliary coil $V_{aux}$ voltage of a converter and a comparator to detect the time taken by the secondary side diode current $I_{Do1}$ to drop to zero, and uses the ZCD signal to configure the RS flip-flop and thus allow the switch to turn on. The operating waveforms of the control circuit in a positive half cycle are shown in FIG. 6.

Figure 7A:
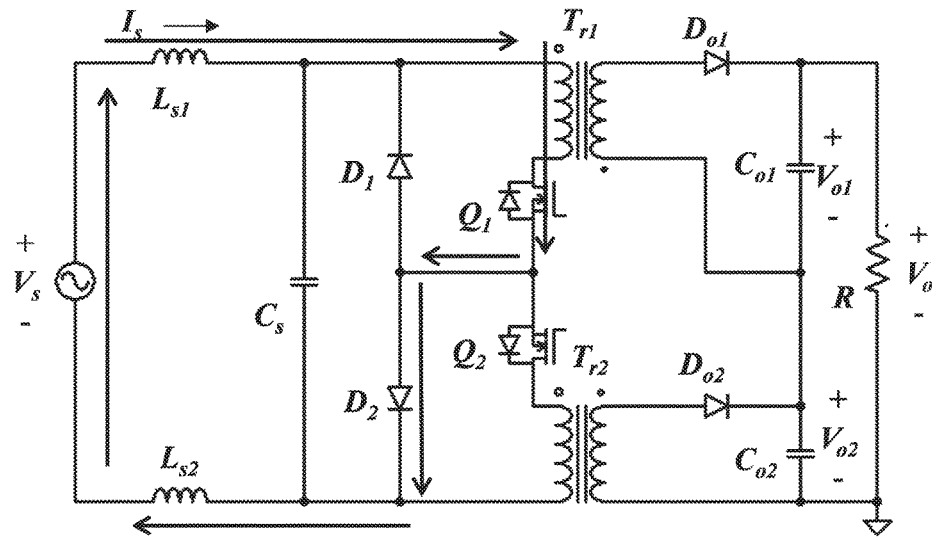
FIG. 7A is a circuit diagram of the single-phase bridgeless insulated power factor adjustment circuit operating by an energy-storing mode in a positive half cycle according to the present invention.
Figure 7B:
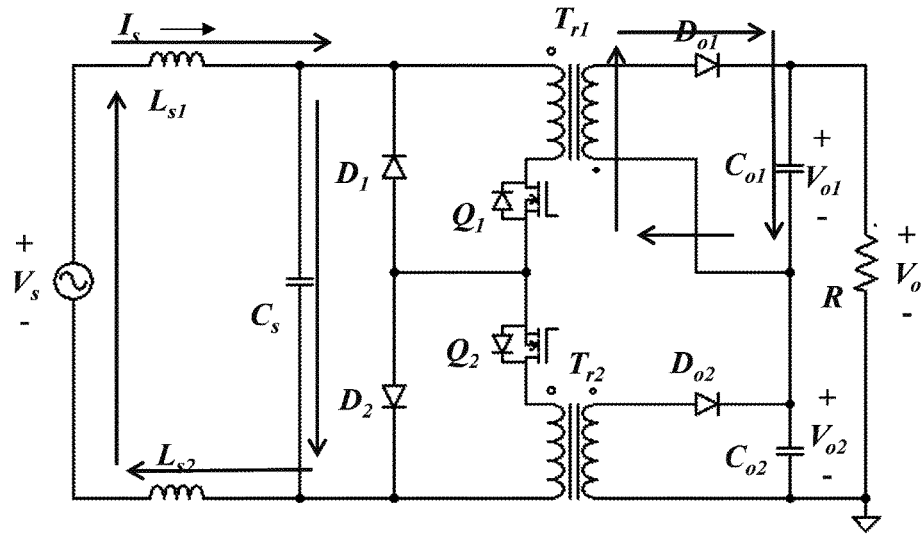
FIG. 7B is a circuit diagram of the single-phase bridgeless insulated power factor adjustment circuit operating by an energy-releasing mode in a positive half cycle according to the present invention.
Figure 7C:
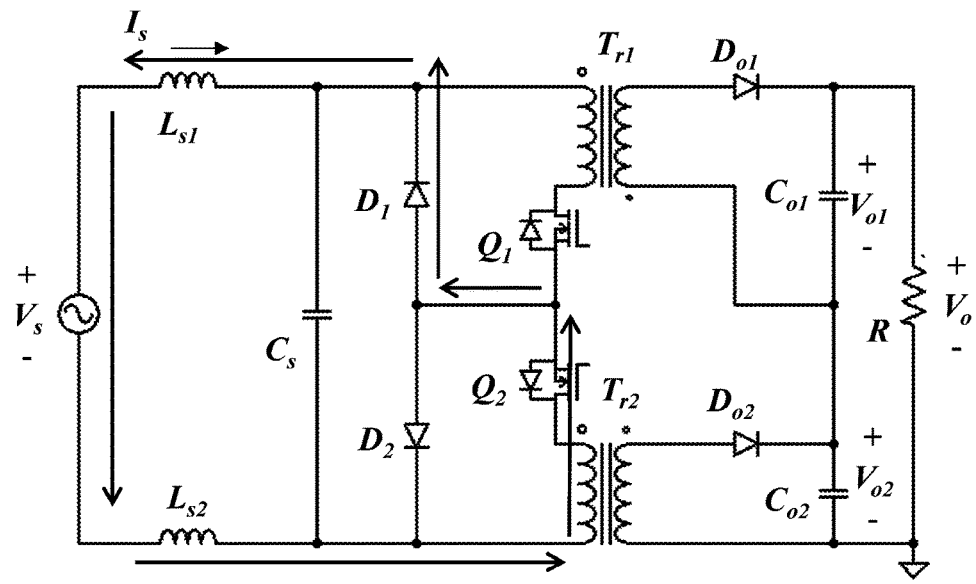
FIG. 7C is a circuit diagram of the single-phase bridgeless insulated power factor adjustment circuit operating by the energy-storing mode in a negative half cycle according to the present invention.
Figure 7D:
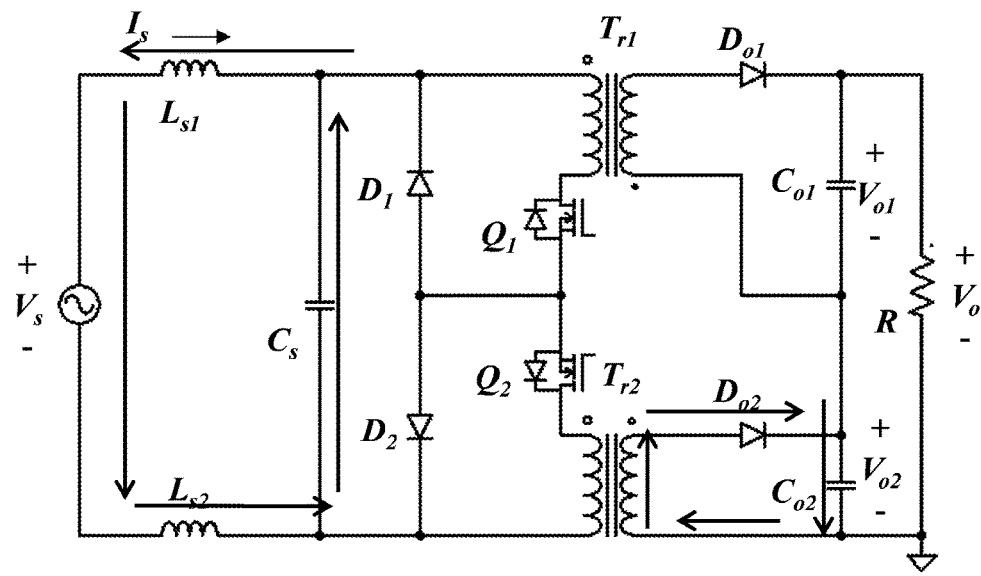
FIG. 7D is a circuit diagram of the single-phase bridgeless insulated power factor adjustment circuit operating by the energy-releasing mode in a negative half cycle according to the present invention.

The waveforms of the voltage output by the AC power VS are divided into a positive half cycle and a negative half cycle. The operating modes of the positive half cycle are shown in FIG. 7A and FIG. 7B. The operating modes of the negative half cycle are shown in FIG. 7C and FIG. 7D. FIG. 7A and FIG. 7C depict the energy-storing mode. FIG. 7B and FIG. 7D depict the energy-releasing mode.

Referring to FIG. 7A, the first switch $Q_1$ turns on, and the first insulated voltage transformation module 30 turns on, whereas the second switch $Q_2$ does not turn on, and the second insulated voltage transformation module 40 turns off meanwhile, the single-phase bridgeless insulated power factor adjustment circuit is defined as operating in first ON state in which current passes the first inductor $L_{S1}$, the first insulated voltage transformation module 30, the first switch $Q_1$, the second one-way diode unit 22 and the second inductor $L_{S2}$ in sequence to form an ON-state path.

Referring to FIG. 7B, neither the first switch $Q_1$ nor the second switch $Q_2$ turns on; meanwhile, the first inductor $L_{S1}$, the first capacitor $C_S$ and the second inductor $L_{S2}$ together form an ON-state path, whereas the first insulated voltage transformation module 30 forms therein an ON-state path.

Referring to FIG. 7C, the second switch $Q_2$ turns on and the second insulated voltage transformation module 40 turns on, whereas the first switch $Q_1$ does not turn on and the first insulated voltage transformation module 30 turns off; meanwhile, the single-phase bridgeless insulated power factor adjustment circuit is defined as operating in second ON state, and current passes the second inductor $L_{S2}$, the second insulated voltage transformation module 40, the second switch $Q_2$, the first one-way diode unit 21 and the first inductor $L_{S1}$ in sequence to form an ON-state path.

Referring to FIG. 7D, neither the first switch $Q_1$ nor the second switch $Q_2$ turns on; meanwhile, the second inductor $L_{S2}$, the first capacitor $C_S$ and the first inductor $L_{S1}$ together form an ON-state path, wherein the second insulated voltage transformation module 40 forms therein an ON-state path.

In the energy-storing mode, the single-phase bridgeless insulated power factor adjustment circuit operates in different ways, depending on whether the waveforms of the voltage input to the AC power $V_S$ are attributed to the positive half cycle or the negative half cycle. The first one-way diode unit 21 and the second one-way diode unit 22 take turns turning on such that the low-frequency switching diode module 20 can be switched between the first ON state and second ON state, and the low-frequency switching diode module 20 can be switched between the first ON state and second ON state in a low-frequency mode.

In the energy-releasing mode, the single-phase bridgeless insulated power factor adjustment circuit operates in different ways, depending on whether the waveforms of the voltage input to the AC power $V_S$ are attributed to the positive half cycle or the negative half cycle.

Referring to FIG. 7A, the first switch $Q_1$ turns on, whereas the insulated coil $T_{r1}$ gets self-induced to store energy. As a result, the linearity of the current $I_{Q1}$ of the first switch increases during the time period $T_{on}$ shown in FIG. 8. Referring to FIG. 7B, the first switch $Q_1$ does not turn on (also known as "cut-off") such that the self-induced energy stored in the insulated coil $T_{r1}$ is released to the load, whereas the linearity of the diode current $I_{Do1}$ decreases during the time period $T_{off}$ (shown in FIG. 8) in the presence of a low-pass filter formed by $L_{s1}$-$C_s$-$L_{s2}$, and in consequence the input current of AC power $V_S$ comes in the form of low-distortion sinusoidal wave, thereby effectuating power factor correction.

Figure 8:
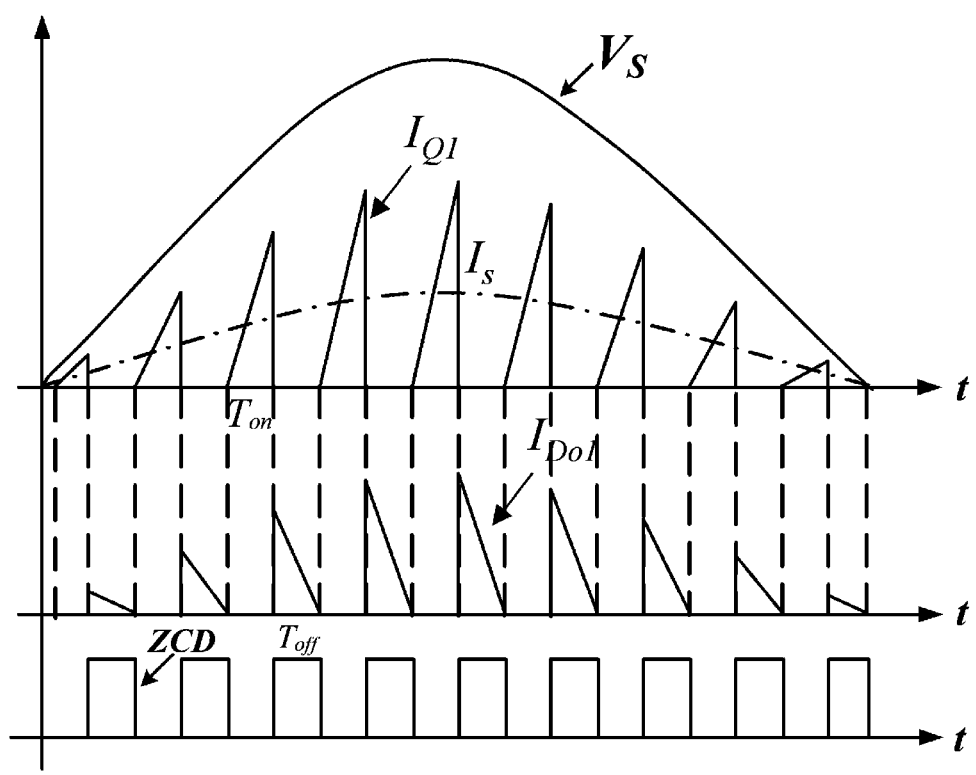
FIG. 8 is a graph of operating waveforms of a control module of the single-phase insulated power factor adjustment circuit operating in a positive half cycle according to the present invention.

In this embodiment, since the underlying operating principle of the negative half cycle is substantially the same as that of the positive half cycle, the operating waveforms in the negative half cycle can be inferred with reference to FIG. 8.

Figure 9:
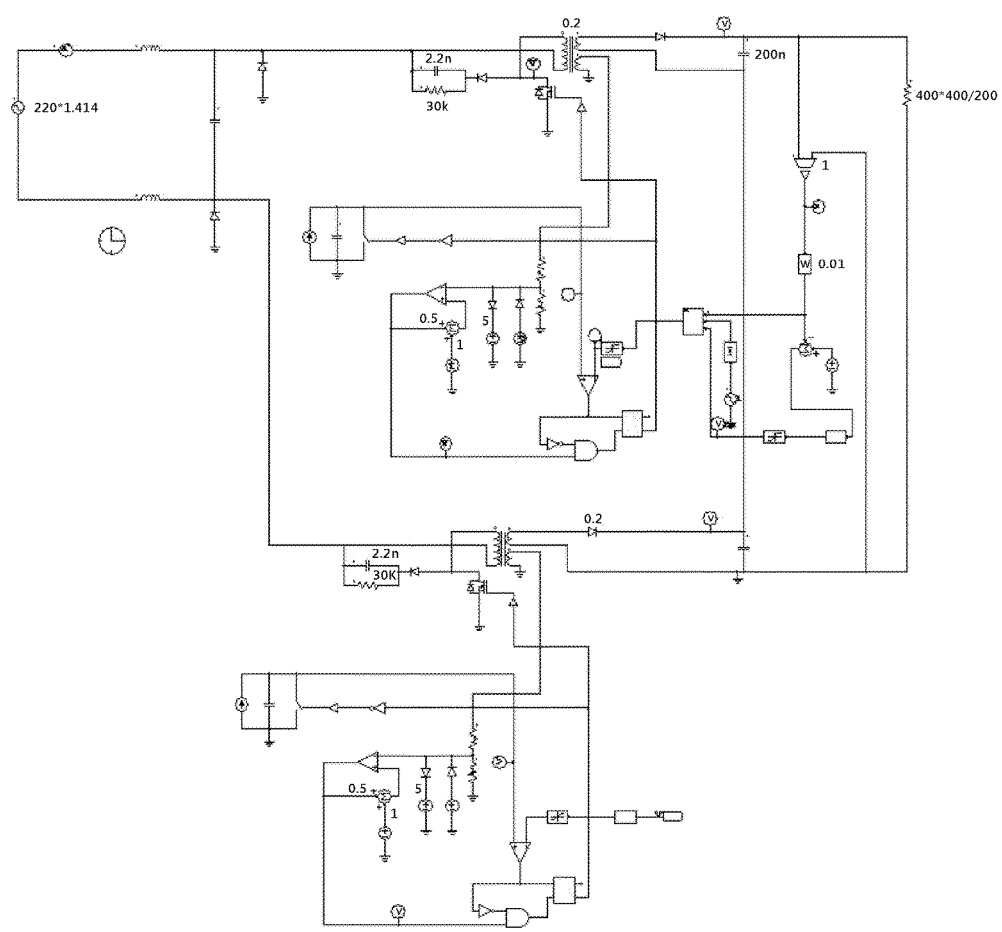
FIG. 9 is a circuit diagram of simulation achieved by the single-phase bridgeless insulated power factor adjustment circuit of the present invention.
Figure 10A:
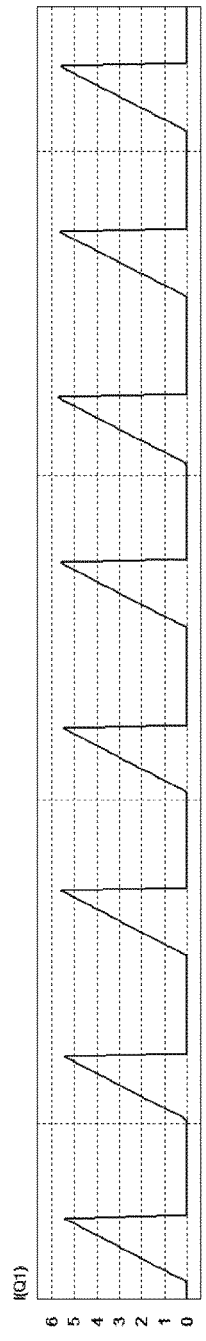
FIG. 10A through FIG. 10C show waveforms illustrative of results of the simulation achieved by the circuit diagram of FIG. 9.
Figure 10B:
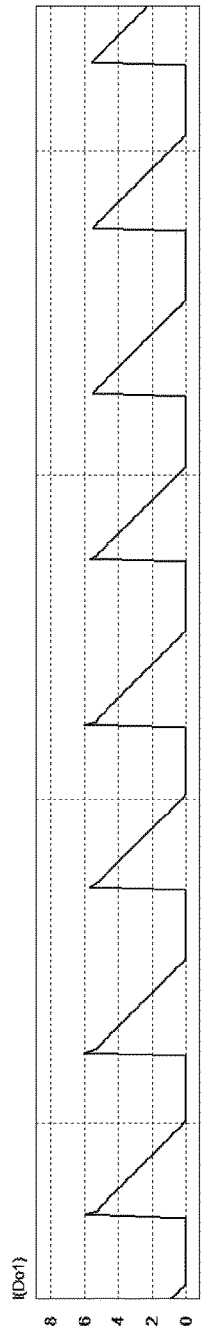
Figure 10C:
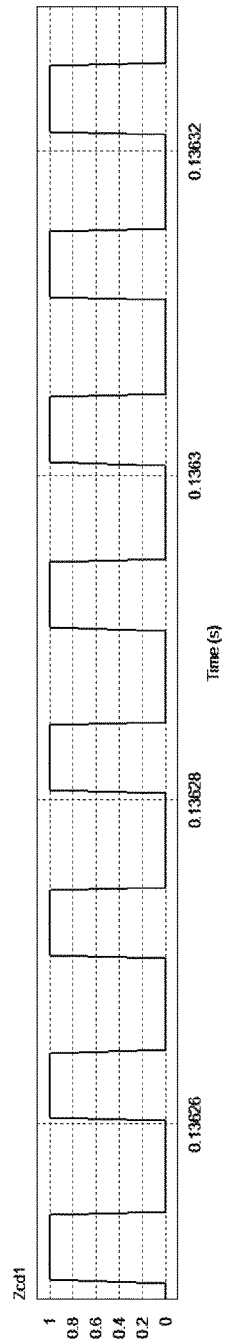

Referring to FIG. 9, a PSIM simulation circuit verifies that the single-phase bridgeless insulated power factor adjustment circuit has the features as follows: a simulated input current of 220$V_{rms}$, a simulated output voltage of 400$V_{dc}$, and a simulated rated load of 200 W. The simulation results are shown in FIG. 10 and FIG. 11. FIG. 10 shows the waveforms of switch current $I_{Q1}$, diode current $I_{Do1}$ and zero current detection signal ZCD in a positive half cycle, indicating that it does effectuate zero current detection whereby a converter operates in critical conduction mode. FIG. 11 shows the waveforms of each part of the simulation circuit, revealing the following: two converters take turns turning on during the positive negative half cycle; the input voltage and current are in-phase; the input current incurs low distortion; the input power factor approximates to 1; the output voltage can also be adjusted to stay at 400V steadily. The aforesaid results of verification show that the bridgeless insulated converter circuit and a control circuit thereof are effective.

The single-phase bridgeless insulated power factor adjustment circuit of the present invention can be applied to a switchable power supply and AC charger to enhance their efficiency, reduce circuit volume, and cut costs. The single-phase bridgeless insulated power factor adjustment circuit of the present invention can further function as a high-voltage output single-level power supplying circuit to cut costs and enhance efficiency.

In conclusion, given the aforesaid circuit configuration, the single-phase bridgeless insulated power factor adjustment circuit of the present invention is unlikely to fail, but features simple circuitry, incurs low costs, be compact, and achieves high conversion efficiency.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

The claims are as follows:

1. A single-phase bridgeless insulated power factor adjustment circuit, comprising:
    an EMI filter module coupled to an external AC power;
    a low-frequency switching diode module coupled to the EMI filter module;
    a first switch coupled to the low-frequency switching diode module;
    a second switch coupled to the low-frequency switching diode module;
    a first insulated voltage transformation module coupled to the first switch; and
    a second insulated voltage transformation module coupled to the second switch;
    a first control module coupled to a gate-end of the first switch to control the first switch to turn on and turn off; and
    a second control module coupled to a gate-end of the second switch to control the second switch to turn on and turn off;
    wherein, with the low-frequency switching diode module being in first ON state, the first switch turns on, and the first insulated voltage transformation module turns on,
    wherein, with the low-frequency switching diode module being in second ON state, the second switch turns on, and the second insulated voltage transformation module turns on;
    wherein the low-frequency switching diode module is switched between the first ON state and the second ON state according to whether an input current of the AC power is in a positive half cycle or a negative half cycle;
    wherein the first control module comprises a first voltage control unit, a first zero current detection unit and a first comparison unit, the first control module being coupled to an output end of the first insulated voltage transformation module to receive a first output voltage feedback signal, the first voltage control unit being adapted to adjust the first output voltage feedback signal so as to send a first switch current control signal, the first zero current detection unit being coupled to the first insulated voltage transformation module so as to send a first zero current detection signal, the first comparison unit being adapted to compare the first switch current control signal with a voltage at an end of the first switch and send a first control signal according to a comparison result and the first zero current detection signal, with the first control signal being for use in controlling the first switch to turn on and turn off, wherein the second control module comprises a second voltage control unit, a second zero current detection unit and a second comparison unit, the second control module being coupled to an output end of the second insulated voltage transformation module to receive a second output voltage feedback signal, the second voltage control unit being adapted to adjust the second output voltage feedback signal so as to send a second switch current control signal, the second zero current detection unit being coupled to the second insulated voltage transformation module so as to send a second zero current detection signal, the second comparison unit being adapted to compare the second switch current control signal with a voltage at an end of the second switch and send a second control signal according to a comparison result and the second zero current detection signal, with the second control signal being for use in controlling the second switch to turn on and turn off.

2. The single-phase bridgeless insulated power factor adjustment circuit of claim 1, wherein the low-frequency switching diode module comprises a first one-way diode unit and a second one-way diode unit, the low-frequency switching diode module being in first ON state being defined as allowing the second one-way diode unit to turn on and allowing the first one-way diode unit to turn off, the low-frequency switching diode module being in second ON state being defined as allowing the first one-way diode unit to turn on and allowing the second one-way diode unit to turn off.

3. The single-phase bridgeless insulated power factor adjustment circuit of claim 2, wherein the first one-way diode unit and the second one-way diode unit take turn turning on such that the low-frequency switching diode module can be switched between the first ON state and the second ON state.

4. The single-phase bridgeless insulated power factor adjustment circuit of claim 1, wherein the EMI filter module comprises:
 a first inductor with an end coupled to an end of the AC power;
 a second inductor with an end coupled to another end of the AC power; and
 a first capacitor with two ends coupled to another end of the first inductor and another end of the second inductor, respectively.

5. The single-phase bridgeless insulated power factor adjustment circuit of claim 4, wherein the low-frequency switching diode module comprises a first one-way diode unit and a second one-way diode unit, the first one-way diode unit having a negative terminal coupled to an end of the first capacitor and another end of the first inductor, the second one-way diode unit having a negative terminal coupled to another end of the first capacitor and another end of the second inductor.

6. The single-phase bridgeless insulated power factor adjustment circuit of claim 5, wherein a positive terminal of the first one-way diode unit and a positive terminal of the second one-way diode unit are coupled to a first node, an end of the first switch and an end of the second switch are coupled to a second node, with the first node being coupled to the second node.

7. The single-phase bridgeless insulated power factor adjustment circuit of claim 1, further comprising:
 a first surge absorbing module coupled to the first switch and the first insulated voltage transformation module; and
 a second surge absorbing module coupled to the second switch and the second insulated voltage transformation module.

* * * * *